(12) United States Patent
Rushing, Sr.

(10) Patent No.: US 9,056,417 B2
(45) Date of Patent: Jun. 16, 2015

(54) SWEEP CORE DIE DEVICE

(71) Applicant: Ricky L Rushing, Sr., Washington, MO (US)

(72) Inventor: Ricky L Rushing, Sr., Washington, MO (US)

( * ) Notice: Subject to any disclaimer, the term of this patent is extended or adjusted under 35 U.S.C. 154(b) by 49 days.

(21) Appl. No.: 13/935,194

(22) Filed: Jul. 3, 2013

(65) Prior Publication Data

US 2014/0010911 A1 Jan. 9, 2014

Related U.S. Application Data

(60) Provisional application No. 61/667,532, filed on Jul. 3, 2012.

(51) Int. Cl.

| | |
|---|---|
| *B29C 45/36* | (2006.01) |
| *B29C 45/40* | (2006.01) |
| *B29C 45/33* | (2006.01) |
| *B29C 33/76* | (2006.01) |
| *B29C 45/26* | (2006.01) |
| *B29C 45/44* | (2006.01) |

(52) U.S. Cl.
CPC ....... *B29C 45/4005* (2013.01); *B29C 2045/363* (2013.01); *B29C 45/332* (2013.01); *B29C 33/76* (2013.01); *B29C 45/2614* (2013.01); *B29C 2045/338* (2013.01); *B29C 45/33* (2013.01); *B29C 45/4435* (2013.01); *B29C 2045/334* (2013.01)

(58) Field of Classification Search
CPC .............. B29C 45/2614; B29C 45/332; B29C 2045/334; B29C 2045/338; B29C 2045/363; B29C 33/76
USPC .......................... 425/577, 466, 467, 468, 414
See application file for complete search history.

(56) References Cited

U.S. PATENT DOCUMENTS

2005/0140060 A1* 6/2005 Evans et al. ................. 264/328.1

* cited by examiner

*Primary Examiner* — Joseph S Del Sole
*Assistant Examiner* — Lawrence D Hohenbrink, Jr.
(74) *Attorney, Agent, or Firm* — Charles McCloskey

(57) ABSTRACT

A sweep core die device for a throttle body, or other part, has a cover insert and an ej insert that engage leaving voids therein, a ram component entering the voids, and cores connected to the ram component by ball joints and other components for simultaneous movement in several axes within the voids. The cores are mirror image and connect to one end of a mount. The other end of the mount pivotally connects to the ej insert. A shaft pivotally connects to each mount and to a clamp outwardly from the inserts. The clamp moves relative to the two inserts, moves the shafts, and thus rotates the cores inwardly and outwardly through the voids. The cores have the internal shape of the passage through each horn of a finished throttle body or other part. The cores produce passages so fuel attains laminar flow within the part.

14 Claims, 13 Drawing Sheets

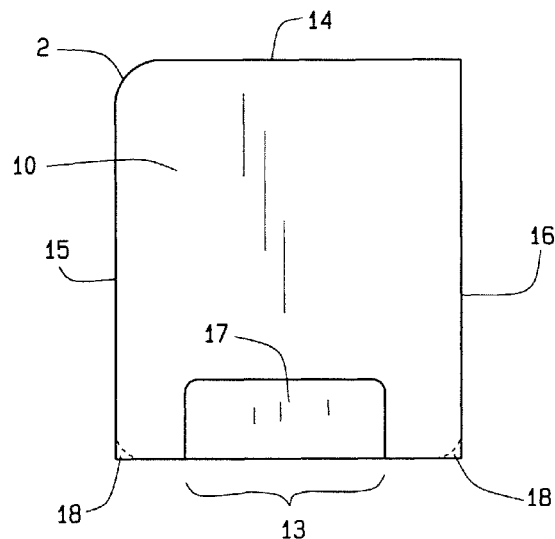
FIG. 3
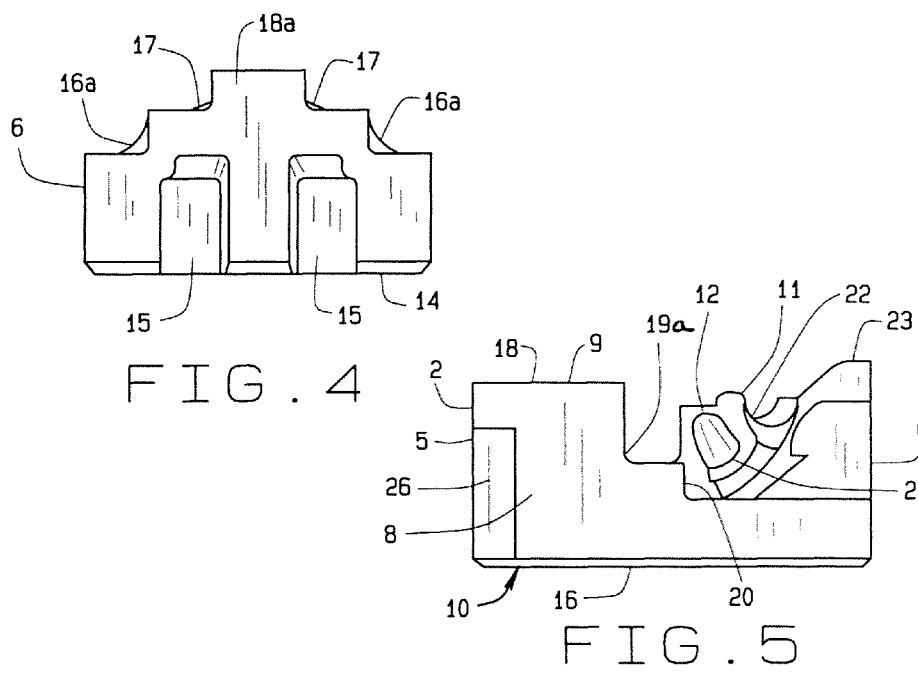
FIG. 4
FIG. 5

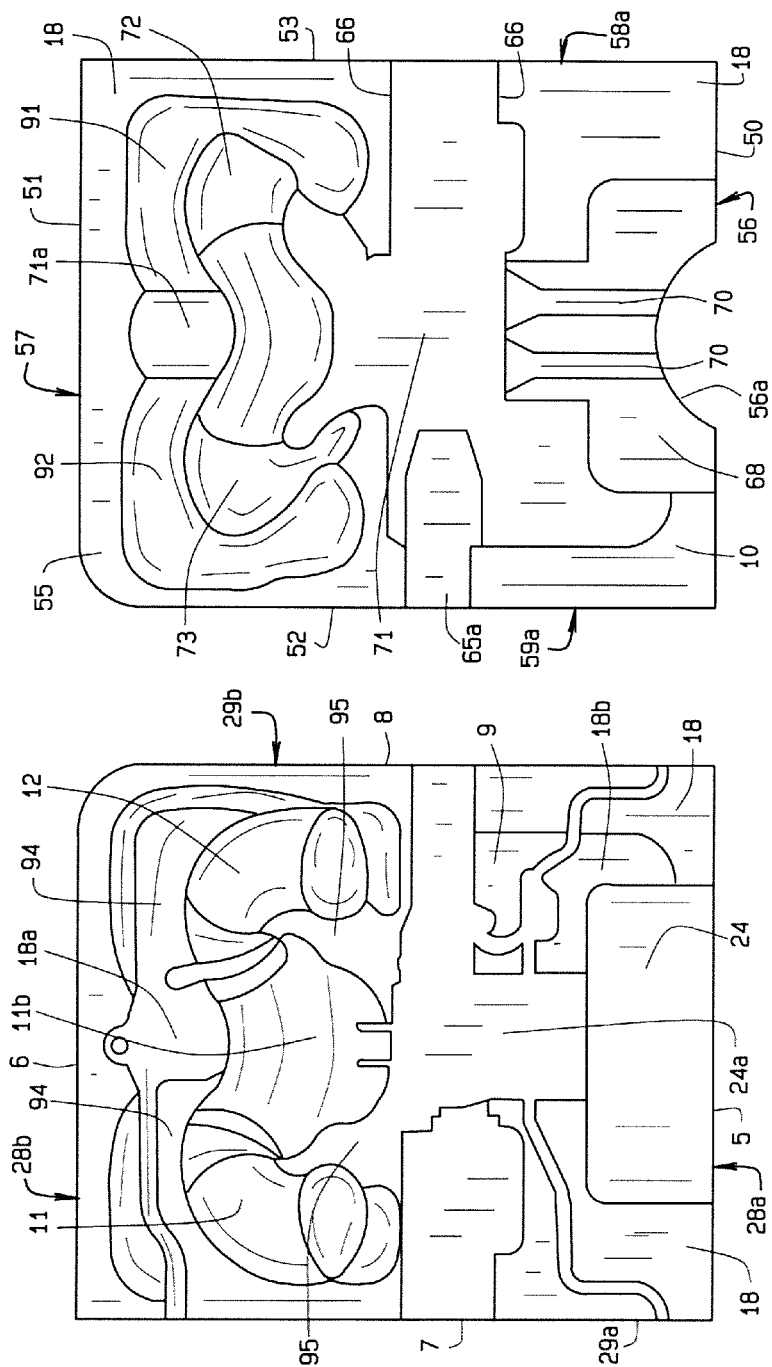

SWEEP CORE DIE DEVICE

CROSS-REFERENCE TO RELATED APPLICATION

This non-provisional application claims priority to the provisional application 61/667,532 filed on Jul. 3, 2012 which is owned by the same inventor.

BACKGROUND OF THE INVENTION

The sweep core die device generally relates to injection dies and more specifically to two piece dies. More particularly, the invention has two movable and retractable arcuate cores that move simultaneously during casting.

Dies produce various parts of many descriptions. Such parts function as individual machines or as a component in another machine. One machine is a motorcycle, having two wheels upon a frame with an engine and transmission and controls for them manipulated by the operator. The operator starts the motorcycle, operates the gears and the brakes, and steers the motorcycle as desired. The motorcycle moves under the power of its engine.

Engines come in a plurality of designs. Yet all engines require fuel. Earlier engines utilized carburetors to blend fuel and air into a mixture. The mixture then entered the cylinders of the engine for combustion. Carburetors performed their blending with precise adjustments to select screws which regulated the flow of fuel and air through venture like passages within the carburetor. In time, the screws accumulate deposits from the fuel and vibration of the engine rattles the position of the screws. With the screws out of position or gummed up, the carburetor releases an altered fuel air mixture and the engine performs differently, usually poorly. The operator notices a decrease in performance when climbing hills or accelerating to pass a car. The operator may also detect an increase in fuel consumption.

Noting the mechanical and fluid weaknesses of carburetors, scientists, engineers, and mechanics worked to develop a replacement, the fuel injector. A fuel injector delivers a precise amount of fuel through a shaped nozzle directly into the top of a cylinder. Each cylinder has its own injector, or throttle body. The injector disperses the fuel into the cylinder generally in mist form. The mist blends with air previously drawn into the cylinder and compressed by the piston into the head of the cylinder. Each throttle body has a sensor that detects the resulting fuel air mixture allowing for adjustment of the fuel into the next stroke of the piston in that cylinder. Each throttle body has electronic communication to a control module where a computer or microprocessor monitors and adjusts the fuel in real time.

DESCRIPTION OF THE PRIOR ART

Over the years, throttle body have had various shapes and configurations to meet the needs of the flowing fuel and control mechanisms. The throttle bodies include passages that accept the fuel as a liquid, convert it into a mist, and further disperse it as a vapor with the air for combustion in a cylinder. The passages have various shapes and dimensions that transform the fuel into its desired state for combustion.

One injector has a shape with two passages that feed fuel simultaneously into the throttle body. Each passage has a truncated horn like shape with its wider end outwardly and its narrower end inwardly. The narrow ends of the two passages merge into the body of the injector. The passages are generally hollow and slightly tapering in diameter from their wider ends to their narrower ends. The passages have a somewhat bifurcated shape of two outwardly extending horns.

Having described the injector, forming a throttle body has proven a challenge. In prior art methods, a wax blank of the throttle body is provided that shows its exterior surfaces and has dimensions that allow for the thickness of the casting material. The wax blank is then placed in a mold with casting sand and an access hole for placement of molten material into the mold. The molten material then dissolves the wax and solidifies in the shape of the throttle body with its exterior surfaces. A crew then breaks the rough injector free from the mold. The interior of the throttle body then undergoes machining to hollow the injector for precise passage of fluid, nearly vaporous fuel. However, machining the two passages in their arcuate forms challenges the skilled machinist. Alternately, a salt blank was used in place of the wax blank.

With an injector formed of polymer, various dies make the throttle bodies in a series of steps. The dies have two pieces that come together with an internal void. When filled the internal void becomes the body of the injector. A later step applies tools to the body of the injector to hollow the body and to make apertures at select positions. Another step inserts tools into each horn at an angle to the centerline of the injector. The tools then hollow the passage through each horn generally at a constant diameter and at a constant angle. Though this prior art method produces two horns with passages for fuel, the fuel flow attains a non-laminar condition, limiting performance of the throttle body and ultimately the cylinder and engine it serves.

The present invention overcomes the disadvantages of the prior art and provides a sweep core die device that forms a throttle body with two bifurcated passages in horns having arcuate forms in opposition. The present invention utilizes two arcuate members simultaneously mechanically actuated within a die to form the passages in the horns. This invention provides an injector having bifurcated fuel flow attaining a laminar condition.

SUMMARY OF THE INVENTION

Generally, the sweep core die device has a cover insert and an ej insert that cooperatively engage leaving a void within them, a ram component that enters the void between the inserts, and two cores mutually connected to the ram for simultaneous movement. These components cooperate for causing simultaneous movement in several different axes within the voids. The cores have a generally mirror image shape and connect to one end of a mount. The other end of the mount pivotally connects to the ej insert. A shaft pivotally connects to each mount and to a cylinder clamp outwardly from the two inserts. The cylinder clamp moves inwardly and outwardly from the two inserts and moves the shafts inwardly and outwardly thus rotating the cores inwardly and outwardly through the void. The cores have the internal shape of the passage through each horn of a finished injector. The cores produce passages that allow fuel to attain laminar flow conditions within the throttle body.

There has thus been outlined, rather broadly, the more important features of the invention in order that the detailed description thereof that follows may be better understood and that the present contribution to the art may be better appreciated. The present invention also includes two mirror image sweep reliefs in the ej insert upon which the cores traverse, ball joint connections of the shaft to the mounts and to the cylinder clamp, and clamp connection of the ball joint and core to the mount. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a sweep core die device that produces two passages in an injector that achieve laminar fuel flow.

Another object is to provide such a sweep core die device that forms passages simultaneously.

Another object is to provide such a sweep core die device that sweeps through any angle whether compound or straight.

Another object is to provide such a sweep core die device that allows for alteration of passage geometry by replacement of cores.

Another object is to provide such a sweep core die device that casts injectors utilizing metals and polymers as materials of the cast injector.

Another object is to provide such a sweep core die device that operates two mirror image portions simultaneously.

Another object is to provide such a sweep core die device that can be easily and efficiently manufactured and marketed to the die makers and molders.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 3 shows a bottom view of the ej insert;

FIG. 4 shows an end view of the ej insert;

FIG. 5 shows a right side view of the ej insert;

FIG. 24 shows a top view of the of the alternate embodiment of the ej insert;

FIG. 25 shows a top view of the of the alternate embodiment of the cover insert that mates with the surface and view shown in FIG. 24;

The same reference numerals refer to the same parts throughout the various figures.

DESCRIPTION OF THE PREFERRED EMBODIMENT

Figure 1:
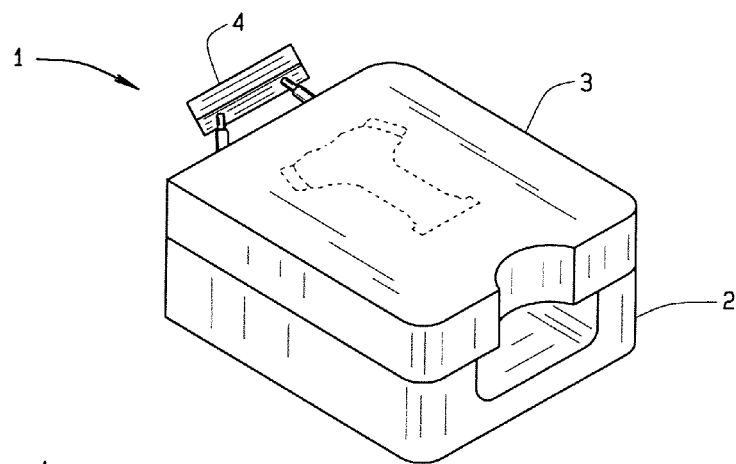
FIG. 1 provides a perspective view of the die and related ram of the invention.

The present art overcomes the prior art limitations by providing a sweep core die device. Turning to FIG. 1, this figure provides a perspective view of the die and related ram assembled into the invention 1 ready to make a throttle body. The die generally has two components an EJ insert 2 and a complementary cover insert 3. Between the two inserts and in an outward direction operates the ram assembly 4. The die, formed of the two inserts 2, 3, partially conceals the ram assembly in this figure. For clarity, additional ports and passage for admission of tooling and raw material are not shown in this figure and subsequent drawings. The two inserts form a die of generally rectangular shape with a thickness and an internal void, not shown, accommodating operations of the ram assembly as it makes throttle body products, as later shown in FIG. 19.

Figure 2:
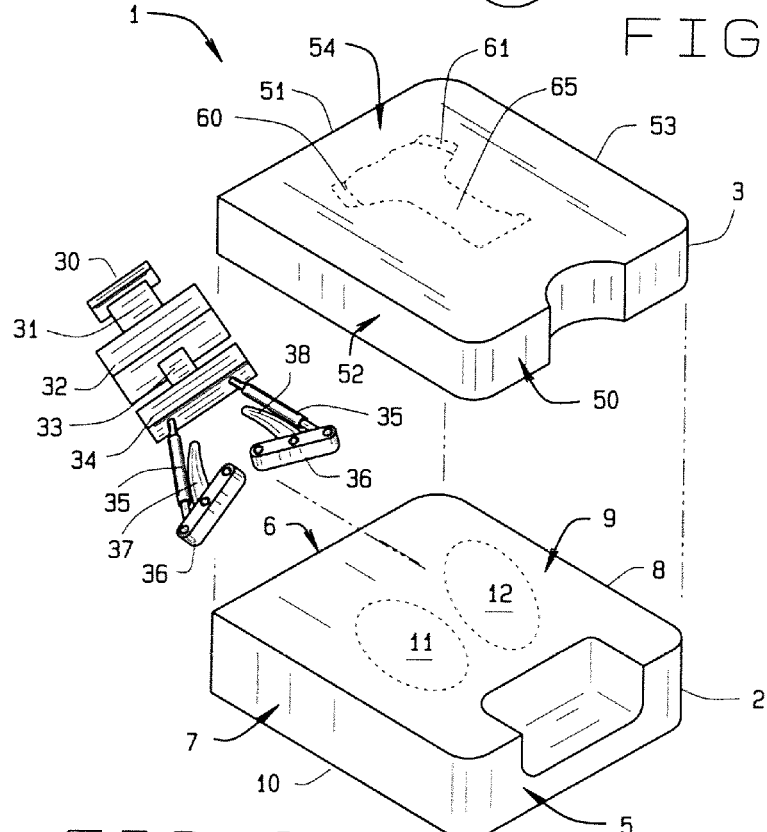
FIG. 2 provides an exploded view of the die components and the ram components.

Opening the invention shown in FIG. 1, FIG. 2 provides an exploded view of the components of the die and the ram assembly 4. The ej insert 2 has its generally rectangular shape with a front end 5 and an opposite back end 6 where the back end provides communication to the ram assembly 4. The ej insert has a left side 7 and an opposite right side 8. Perpendicular to the left side, the right side, the front end and the back end, the ej insert has a top 9 as a working surface in contact with the throttle body product during its manufacture within the invention. Mutually parallel to the plane defined by the top and spaced beneath the top, the ej insert has its bottom 10. Within the top, the ej insert has two mirror image working haunches, a left haunch 11 and a right haunch 12. The haunches cooperate with the ram assembly to allow a sweeping motion during manufacture of a throttle body within the invention.

The ram assembly has select components that receive an external driving force inwardly and outwardly from the die. During application of the driving force, components of the assembly operate in a sweeping motion to form portions of a throttle body. The ram assembly has a head 30 generally round and perpendicular to the plane of the top surface, a neck 31 inwardly from the head and of a lesser width, a shoulder 32 inwardly of the neck and of similar width as the head and larger width than the neck, and a leg 33 of lesser width and length than of the neck. The head, neck, shoulder, and leg are all coaxial and generally centered upon the back end 6 of the ej insert. Inwardly from the leg, the ram assembly has a ball joint clamp 34 of a generally rectangular shape oriented transverse to a centerline through the head and leg. The ball joint has two receptacles, not shown, that each receive a ball joint shaft 35. Each of the two ball joint shafts has two rounded ends, an elongated shape, and a round cross section. One end connects to a receptacle and the other end connects to a mount 36. The ram assembly has two ball joints and two mounts that move in mirror image of one another. Each mount itself has two ends with one end pivotally connected to a haunch, 11, 12 and the other end joined to a core 37, 38. The core has a generally horn like shape as later shown in FIGS. 15a to 18a with a wider portion upon the mount and a narrower portion away from the mount in an outward and downward curve, that is, towards the bottom 10 of the ej insert when assembled. The other end of a ball joint shaft 35 connects to a mount between the pivotal connection to the haunch and the joint with the core. During operation of the invention, as later shown in FIGS. 15a, 15b, 18a, 18b, movement of the ram assembly outwardly pulls the ball joint shafts outwardly, the mounts inwardly, and the cores inwardly as during formation of a throttle body. Then movement of the ram assembly inwardly pushes the ball joint shafts inwardly, the mounts outwardly, and the cores outwardly as during ejection of a throttle body from the invention.

As shown in this figure above the ram assembly, the invention has the cover insert 3. The cover insert also has its generally rectangular shape with a front end 50 and an opposite back end 51 where the back end provides communication to the ram assembly 4 shown below in this figure. The cover insert has a left side 52 and an opposite right side 53. Perpendicular to the left side, the right side, the front end and the back end, the cover insert has its top 54, generally planar. Opposite the top and generally mutually parallel to the plane defined by the top, the cover insert has its bottom 55 as a working surface in contact with the throttle body product during its manufacture and with the top 9 of the ej insert 2 below in the invention. Within the bottom, the cover insert has two branches 60, 61, shown in phantom, in mirror image that cooperate with the ram assembly 4 and the left haunch 11 and right haunch 12 of the ej insert. The branches cooperate with the ram assembly to allow a sweeping motion within the die formed of the cover insert and the ej insert.

FIG. 3 shows a bottom view of the ej insert 2 with its bottom 10 in the foreground. The bottom has a generally planar shape with four edges defining a generally rectangular shape. The four edges include a front edge 13 and a somewhat parallel and spaced apart back edge 14, and a left edge 15 and a mutually parallel and spaced apart right edge 16. The left edge and the right edge are generally perpendicular to the front edge and the back edge. The front edge also includes an indented portion shown in phantom as at 17 generally centered upon the front edge and defining two ears as at 18. At each mutual intersection of two edges, the intersection attains a rounded corner as shown. Upon the front edge, it has two corners shown spaced apart and rounded. Inwardly into the plane of this figure, the bottom 10 has the ears 18 shown as square corners define by the mutual intersection of two edges upon the top surface 9 as later described in FIG. 8.

Adjusting the view from the bottom 10 to the perimeter of the ej insert 2, FIG. 4 shows an end view of the back 6. The back 6 begins from the back edge 14 and extends upwardly in a generally planar and rectangular shape. However, the rectangular shape of the back has two mirror image apertures 15. Each aperture has a rectangular shape with the longer axis of the shape oriented perpendicular to the back edge 14. The apertures open into the interior of the ej insert showing the haunches 11, 12 in the background. The back 6 extends upwardly from the aperture and steps inwardly in its width, as at 16a. The back 6 then continues upwardly and steps inwardly a second time in its width, as at 17. The back terminates in a shoulder 18a of a width that of the spacing between the apertures and of a height much less than proximate the first step as at 16a.

Turning to FIG. 5, it shows a right side view of the ej insert 2. The ej insert has the front 5 towards the left in the figure and the back 6 towards the right in the figure. Between the front and the back, the ej insert has its bottom 19 and the rounded corners where the front and the back intersect with the bottom. In this figure, the right edge 16 of the bottom is in the foreground and defines the bottom edge of the ej insert in the figure. The ej insert has a generally constant thickness inwardly from the front for approximately one third of its length. Then the ej insert steps downwardly in thickness as at 19a where that thickness decreases to about one half of the preceding thickness. The ej insert steps downwardly a second time in thickness as at 20 slightly past the midpoint and towards the back 6. The thickness as at 20 defines the lowest plane of the right haunch 12. The right haunch has a generally concave and arcuate shape upon two axes and a centerline along its length where the centerline has an orientation towards the corner 18 with the back 6. The right haunch has its wide base as at 21 and upwardly and inwardly from the base, it has a pivotal groove 22 that receives a component of the ram assembly, particularly the ball clamp. In the background of the right haunch 12 is the left haunch 11. Rearwardly, that is towards the back 6, from the groove 22, the ej insert has the doghouse 23 between the left haunch and the back. The dog house has additional thickness, more so than the initial thickness of the ej insert proximate the front 5. The right side 8 also includes various ports and apertures, not shown, for admission of subordinate tooling, air streams, and pelletized raw material.

Figure 6:
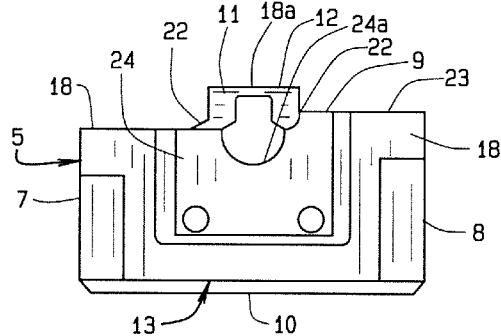
FIG. 6 shows an end view, opposite FIG. 4 of the ej insert.

Turning again, FIG. 6 shows an end view, opposite that of FIG. 4 of the ej insert with the front 5 in the foreground. The ej insert has the left side 7 and the opposite right side 8 generally mutually parallel and spaced apart. The bottom 10 merges with the left side and the right side along front edge 13 and forms corners. Upwardly from the bottom, the left side and the right side each terminate in ears 18. Each ear represents the maximum length of the left side and the right side generally along the top 9. Each ear has its thickness, less than that of the overall ej insert. Beneath each ear, that is, towards the bottom, the left side and the right side have slightly less length defining a slot 26 between each ear and the bottom. Between the two ears, the front 5 has a well 24 of a generally rectangular shape. The well extends vertically from the ears downwardly towards the bottom for at least 50% of the thickness of the ej insert at the front 5 and extends into the plane of the paper for approximately the thickness of an ear 18.

Inwardly from the front 5, the well 24 has a curved recess 24a, generally hemispherical in shape and opening towards the top 9. Outwardly from the recess 24a, the well has the left haunch 11 and the right haunch 12, more particularly the groove 22. In the background of the recess 24a, the ej insert has the shoulder 18a, previously described in FIG. 4.

Figure 7:
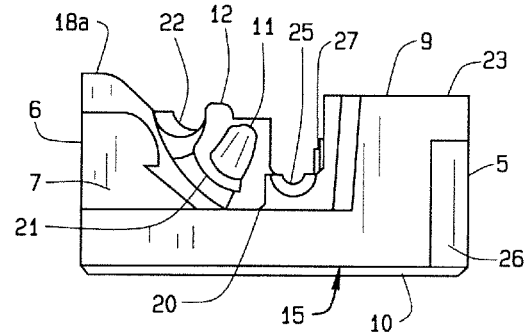
FIG. 7 shows a left side view of the ej insert.

FIG. 7 shows a left side view of the ej insert 2, this view being opposite that of FIG. 5 described above. The left side 7 of the ej insert begins with the back 6 towards the left in this figure. The back has its thickness shown by the shoulder 18a spaced above the left edge 15 The remainder of the left side and its features has a lesser thickness than the shoulder. Opposite the back, the ej insert has its front 5 with the bottom 10 merging with the back and the front at the rounded corners. Left edge 15 of the bottom extends between the front and the back as shown. Above the left edge, the left side continues inwardly from dog house at a generally declining thickness to the groove 22. The groove in the top surface 9 happens below the shoulder and then has the left haunch 11 forward of the doghouse, that is, towards the front 5 on the right of the figure. The left haunch 11 has a generally concave arcuate, horn like shape and wide base as at 21. A centerline through the left haunch passes through the base towards the corner at the junction of the back with the left edge 15 and the back 6. In the background of the left haunch, the ej insert has the right haunch 12 previously described. Towards the center of the interior of the ej insert, the left haunch has the groove 22 being generally semi-circular in cross section. The groove also leads to the right haunch 12 in the background. The groove appears similar to a saddle with the two haunches extending downwardly and outwardly in a curved manner away from the groove towards the back.

Inwardly from the left haunch, that is towards the front 5, the ej insert has its second step 20 in thickness. The second step reduces the thickness of the ej insert to less than that below the left haunch. The second step occurs approximately at the midpoint of the left side. The second step has a generally rectangular form until it reaches the third step 27 which raises the thickness for a short distance and then the first step 19 returns the thickness to approximately that of the doghouse 23 towards the background upon the top 9. Within the second step, the ej insert has a wall 25 generally transverse to the second step.

Figure 8:
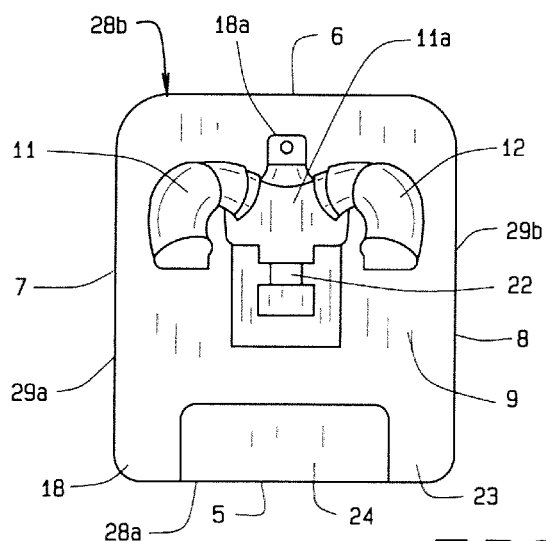
FIG. 8 shows a top view, opposite FIG. 3, of the ej insert.

FIG. 8 shows a top view, opposite FIG. 3, of the ej insert 2 with the top surface as at 9 in the foreground. The top 9 merges with the back 6 and the front 5, each being spaced apart and mutually parallel as previously described. The top merges along the front edge 28a and the back edge 28b. The top also merges with the left side 7 and the right side 8, also spaced apart and mutually parallel but perpendicular to the back and the front where the left side, right side, back, and front define a rectangular shape. The top merges to the sides along the left side edge 29a and the right side edge 29b respectively. The front edge 28a extends outwardly to the ears 18 and has the well 24 generally centered upon the front edge and beneath the front edge. The well as shown has a generally rectangular shape.

Interiorly from the well, the top 9 has the groove 22. The groove has a generally rectangular shape at the top 9 that becomes a half round cylinder recessed into the top. The groove is approximately at the midpoint of the ej insert along the left side and the right side, or length. Interiorly from the groove, that is, towards the back 6, the ej insert has the left haunch 11 and the right haunch 12. The two haunches each have a mirror image shape along the centerline of the top parallel to the left side edge and the right side edge. The two haunches form a shape generally similar to a set of horns extending from a common central area, as at 11a, outwardly and downwardly curved to a truncated tip on each haunch. The haunches generally have a recessed orientation into the top 9 that is into the plane of the figure. The central area 11a has a width slightly more than either haunch and has a contraction in its width along the centerline of the top where the two haunches merge. Outwardly from the width contraction, the top surface has the shoulder 18a extending outwardly from the plane of the figure towards the reader. The top also includes various ports and holes for admission of tools, raw material, and bolts for securing the ej insert to the remainder of the invention.

Figure 9:
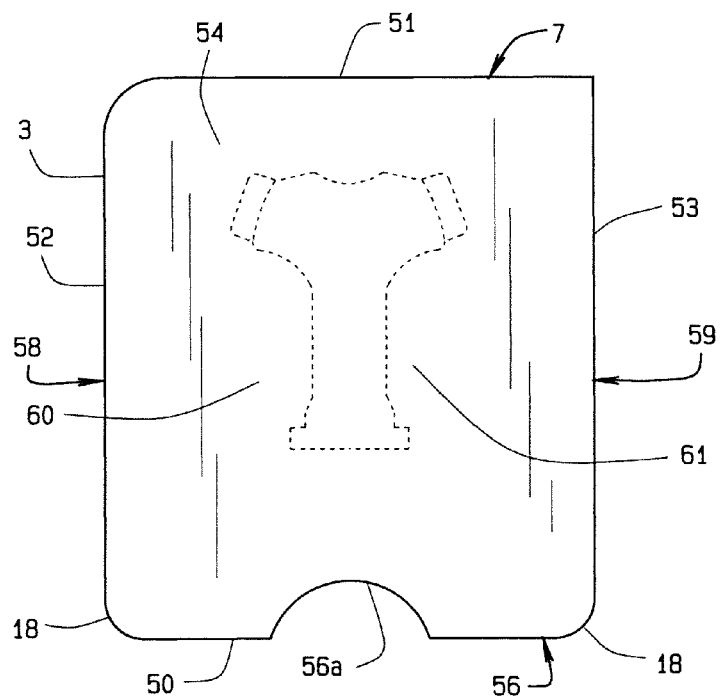
FIG. 9 illustrates a top view of the cover insert.

FIG. 9 illustrates a top view of the cover insert 3 with its top 54 in the foreground. The bottom has a generally planar shape with four edges defining a generally rectangular shape. The four edges include a front edge 56 and a somewhat parallel and spaced apart back edge 57, and a left edge 58 and a mutually parallel and spaced apart right edge 59. The left edge and the right edge are generally perpendicular to the front edge and the back edge. The front edge also includes an indented portion shown in phantom as at 56a generally centered upon the front edge. The indented portion has a generally arcuate shape, that is, concave. The indented portion overlays the well 24 of the ej insert 2. At each mutual intersection of two edges, the intersection attains a rounded corner as shown. Upon the front edge, it has two corners shown spaced apart and rounded. Inwardly into the plane of this figure, the top 54 also has two ears 18 shown as square corners define by the mutual intersection of two edges upon the top surface 54 as later described in FIG. 14. With the top 54, the cover insert has its two branches, 60 on the left, 61 on the right shown in phantom.

Figure 10:
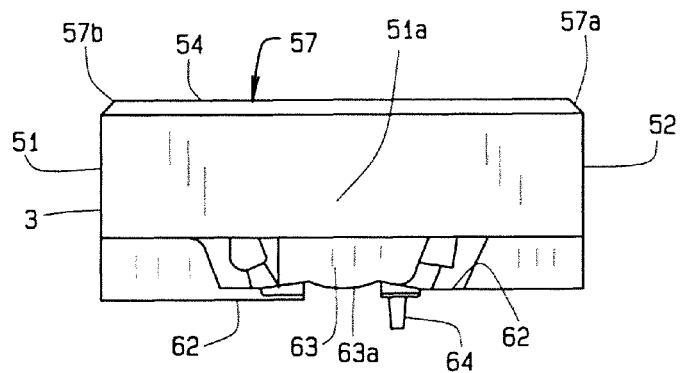
FIG. 10 illustrates an end view of the cover insert.

FIG. 10 illustrates an end view of the cover insert, particularly the back end 51. This back end 51 begins from the back edge 57 and extends downwardly in a generally planar and rectangular shape. However, the to rectangular shape of the back has two mirror image protrusions 62 into the plane of the figure. Each protrusion has a generally trapezoidal shape in this figure with the narrow base of the shape away from the top 54, and extends for the thickness of the cover. Spanning between the protrusions, the cover insert has a tooth 63 of similar height as the protrusions and have a somewhat undulating edge 63a. The tooth does not extend vertically beyond the protrusions. Outwardly from the tooth and towards the left side 52, the cover insert has a tube 64 depending beneath one protrusion 62. The tube has less width than the protrusion and a height beneath the remainder of the insert slightly less than the height of a protrusion. The tube is generally rectangular and hollow in cross section. Alternatively, the tube has a hollow round cross section. Moving upwardly in this view from the protrusions and the tooth, the back end 51 has a left corner as at 57b generally square in shape from the intersection of the back edge 57 and the left side edge 58 and a right corner as at 57a generally rounded in shape from the intersection of the back edge 57 and the right side edge 59. Slightly off center upon the back end, the cover insert has a port 51a for admission of material or tooling within the cover insert to the branches 60, 61.

Figure 11:
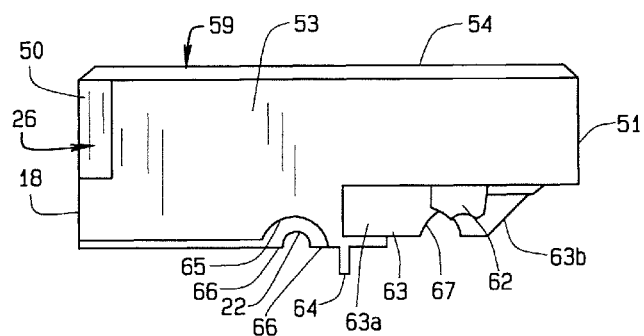
FIG. 11 illustrates a right side view of the cover insert.

FIG. 11 illustrates a right side view of the cover insert 3. The cover insert has the front end 50 towards the left in the figure and the back end 51 towards the right in the figure. Between the front end and the back end, the cover insert has its top surface 54 and the rounded corners where the front end and the back end intersect with the top. In this figure, the right edge 59 of the top is in the foreground and defines the top edge, generally straight, of the cover insert shown in this figure. The cover insert begins with a slot 26 descending from the top at the intersection of the front end and the top to an ear 18. The slot has a generally convex cross section, that is, a curvature with a radius from the center of the cover insert. The ear though defines a square corner that extends over the slot. From the slot and the ear to the right, that is, inwardly from the front end, the cover insert has a generally constant thickness to the vicinity of the midpoint of the right side 53. As the right side approaches its midpoint, its thickness decreases at a valley edge 66 here shown at the border or edge of an indentation in the figure towards the top 54. The valley edge extends just past the midpoint of the right side towards the tube 64. Into the plane of the paper within the valley edge 66, the cover insert has a partial groove 22 that mates with its counterpart groove in the ej insert 2. The partial groove 22 extends for about half the length of the counterpart groove as later shown in the bottom view of the cover. The tube extends beneath the valley edge towards the ej insert when assembled. Outwardly from the tube, the cover insert has the interior portion 63a of the tooth 63 for about twice the length of a protrusion 62. The interior portion 63a merges with the exterior portion 63b defining another groove 67 for admission of a component of the ram assembly. This other groove 67 has its depth more into the thickness of the cover insert than the partial groove 22. Generally aligned with the other groove 67, the cover insert has the protrusions 62 on the right and the left of the tooth 63, here the figure just shows the right protrusion. Outwardly from the protrusion, the tooth tapers to the main portion of the cover insert at its thickness that continues to the back end 51. The thickness of the right side proximate the back end is generally slightly more than the depth of the slot 26 at the front end. The right side 53 also includes various ports and apertures, not shown, for admission of subordinate tooling, air streams, and pelletized raw material.

Figure 12:
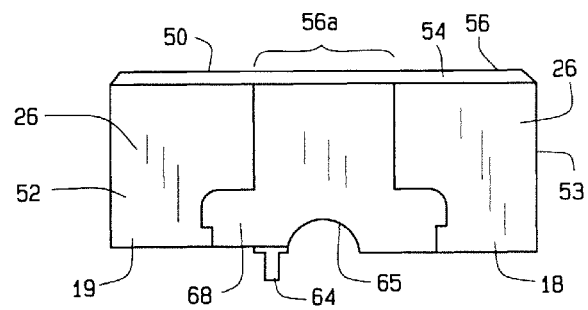
FIG. 12 illustrates an end view, opposite FIG. 10 of the cover insert.

Turning again, FIG. 12 illustrates an end view, opposite FIG. 10 of the cover insert with the front end 50 in the foreground. The cover insert has the left side 52 and the opposite right side 53 generally mutually parallel and spaced apart. The top 54 merges with the left side and the right side along front edge 56 and forms rounded corners as previously shown in FIG. 9. Downwardly from the top, the left side and the right side each terminate in ears 18 that form a square corner beneath the slots 26 of the rounded corners. Each ear represents the maximum length of the left side and the right side generally along the bottom surface 55 of the cover insert 3. Each ear has its thickness, less than that of the overall cover insert. Above each ear, that is, towards the top 54, the left side and the right side have slightly less length defining a slot 26 between each ear and the top. Between the two ears, the front end 50 has another well 68 of a generally rectangular shape indented towards the interior of the cover insert. The other well extends vertically from the ears upwardly towards the top more than the thickness of the ears and less than the thickness of the cover insert at the front end 50 and extends into the plane of the paper for approximately the thickness of an ear 18. More precisely, the ear proximate the right side 53 has a slightly greater thickness than the ear proximate the left side 52. Inwardly from the left side and the right side and beneath the other well 68, the front end has a curved recess 56a, generally curved in shape and opening towards the front end 50. This curved recess 56a extends downwardly from the top 54 and intersects the other well 68. Inwardly from the center of the other well at the bottom surface 55, a valley 65 extends generally along the centerline of the cover insert. The valley has a stepped cross section at the other well 68 that then becomes a semicircular cross section proximate the partial groove 22 further inwardly, that is, towards the center of the cover insert. Inwardly also from the other well 68 and proximate the left side, the cover insert has the tube 64 generally depending at length greater than the thickness of the remainder of the cover insert. The front end 50 also includes various ports and apertures, not shown, for admission of subordinate tooling, air streams, and pelletized raw material.

Figure 13:
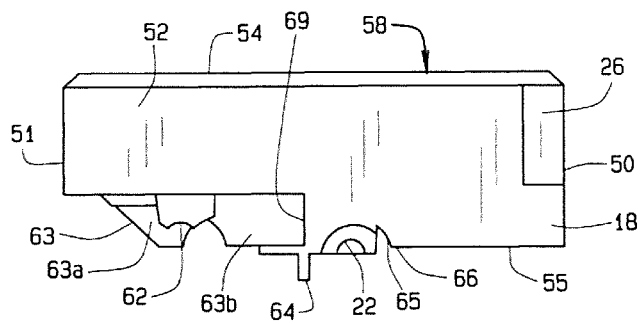
FIG. 13 illustrates a left side view of the cover insert.

Then turning the cover again, FIG. 13 illustrates a left side view of the cover insert, this view being opposite that of FIG. 11 described above. The left side 52 of the cover insert begins with the front end 50 towards the left in this figure. The front end has its thickness shown by the ear 18 at the bottom surface 55 and spaced below the top surface 54. The remainder of the left side 52, and its features, have a greater thickness than the ear 18. Opposite its merge with the front end, the cover insert has its back end 51 merging with the top surface 54 at rounded corners. Left edge 58 of the top extends between the front end and the back end as shown. Beneath the left edge, the left side 52 continues inwardly from the ear 18 with the slot 26 above it at a generally constant thickness to a valley edge 66 where the valley 65 intersects with the interior of the cover generally proximate its centerline. Generally perpendicular to the valley and inwardly from the valley edge 66, the cover has a partial groove 22 that cooperates with its counterpart in the ej insert, unlike in FIG. 11, this partial groove is in the foreground of this figure. The partial groove is slightly below the valley edge and curves inwardly towards the top surface 54. Inwardly from the partial groove 22 and just past the midpoint of the left side, the cover shows the tube 64 depending beneath the remainder of the cover insert. Outwardly from the tube, that is, towards the back end 51, the cover insert steps down in thickness as at 69, slightly less than the thickness of an ear. Upon this stepped down portion, the bottom surface 55 includes the interior portion 63b of the tooth with its groove 67 and then the exterior portion 63a of the tooth that both combine to form the tooth. Outwardly from the tooth and along the groove, the bottom surface 55 also has the two protrusions 62, the left protrusion 62 begin shown in this figure. The exterior portion of the tooth declines in thickness before the back end. The left side 52 also includes various ports and apertures, not shown, for admission of subordinate tooling, air streams, and pelletized raw material.

Figure 14:
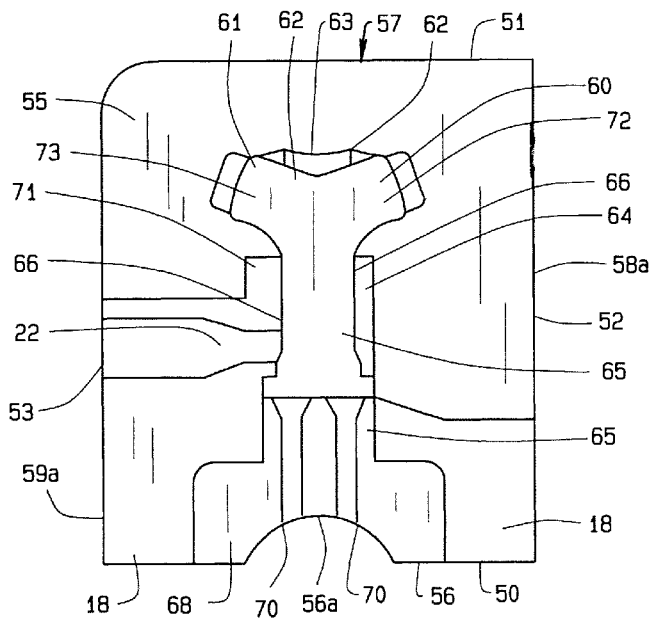
FIG. 14 illustrates a bottom view, opposite FIG. 9, of the cover insert.

Next, FIG. 14 illustrates a bottom view, opposite FIG. 9, of the cover insert with the bottom surface as at 55 in the foreground. The bottom 55 merges with the back end 51 and the front end 50, each being spaced apart and mutually parallel as previously described. The bottom merges along the front edge 56 with its indentation as at 56a and the back edge 57. The bottom also merges with the left side 52 and the right side 53, also spaced apart and mutually parallel but perpendicular to the back and the front where the left side, right side, back, and front define a generally rectangular shape. The bottom merges to the sides along the left side edge 58a and the right side edge 59b respectively. The front edge 56 extends outwardly to the ears 18 and has the other well 68 generally centered upon the front edge and upwardly from the front edge. The other well as shown has a generally rectangular shape but has the indentation 56a within it.

Interiorly from the other well 68, the bottom surface 55 has two spaced apart and mutually parallel channels 70 generally parallel to the left side 52. The two channels extend from the well and flare outwardly proximate the valley 65. The valley has its curved shape, similar to a barrel, that extends into the cover insert, that is, into the plane of the figure. The valley has its edges 66 and the edge 66 towards the left side 53 admits the partial groove 22 generally perpendicular to the valley, that is, parallel to the front end 50. The valley fits within a somewhat rectangular plain 71 that cooperates with the central area of the ej insert. Opposite the channels, the valley opens into two branches, a left branch 72 and a right branch 73. The two branches each have a mirror image shape along the centerline of the bottom surface 55 parallel to the left side edge and the right side edge. The two branches form a shape generally similar to a truncated letter Y extending from the plain 71, outwardly and downwardly curved to a truncated tip on each branch. The branches generally have a recessed orientation into the bottom surface 55, that is, into the plane of the figure. The two branches cooperate with the two haunches of the ej insert forming a void defining the two merge portions of the fuel throttle body produced by this die set. Outwardly from the two branches, the bottom surface has the protrusions 62 flanking the tooth 63. The bottom surface also includes various ports and holes for admission of tools, raw material, and bolts for securing the cover insert to the remainder of the invention.

Figure 15A:
FIG. 15a describes a top view of the cores in the open position, and FIG. 15b describes a top view of the cores in the closed position.

Having described the ej insert and the cover insert that cooperate and form a void, the remaining figures describe the operation and components of the ram assembly. The ram assembly operates within the void between the two inserts primarily in the vicinity of the haunches and the branches. The ram assembly ultimately operates two cores, the left core 37 and the right core 38 that form the bifurcation of the finished throttle body that provides laminar fluid flow to a throttle body system of an engine. Meanwhile, FIG. 15a describes a top view of the cores in the open position, and FIG. 15b describes a top view of the cores in the closed position. As to FIG. 15a, the left core 37 has a tip 80 defining the narrowest portion of the core, a body 81 widening from the tip in an arcuate form, and a base 82 defining the widest portion of the core and the end of the body. The body is generally round in cross section though the diameter varies from its smallest at the tip to its largest at the base. The base fixes to the core mount 36 which has a generally elongated, linear shape and two opposite ends. The first end 36a receives the base of a core and the opposite second end 36b pivotally connects to the ej insert proximate the central area 11a. FIG. 15a shows the cores 37, 38 oriented outwardly and the core mounts 36 generally collinear, that is, parallel to the fronts 5, 50 of the inserts. The cones in this position occupy the outward most portions of the voids between the haunches and the branches. The cones in this position await placement of raw material and preceding tooling upon the throttle body as the throttle body takes the shape of the valley and voids.

Figure 15B:
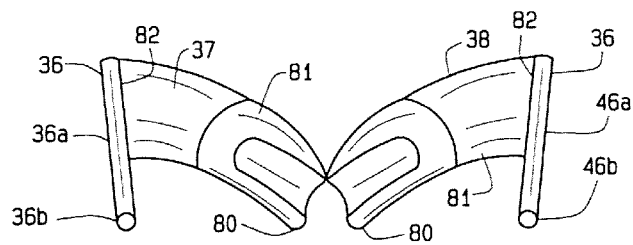

However, the bifurcations of the desired throttle body must admit and pass fluids in a laminar manner through them. FIG. 15B shows the cores rotated mutually inwardly upon their mounts to achieve the closed position. In this position, the cores form the hollow bifurcations of the throttle body so that the throttle body achieves laminar flow and its related fuel savings. In the closed position, the tips 81 of the two cores adjoin within the central area 11a, generally upon the centerline of the inserts combined into a die of this invention. The two bodies 81 extend outwardly from the tips, similar to horns upon an animal but in a reverse manner of narrowest to widest. The bases 82 of the cores remain connected to their mounts 36 at their first ends 36a. The core mounts 36 achieve an inward rotation about their second ends 36b of approximately 45° to approximately 75°. The cores remain in this position for the time necessary for the material to cool in its throttle body form. Upon passage of that time, the ram assembly reverses and rotates the cores outwardly to the open position and the die ejects the throttle body with its bifurcations for final finishing. The ram assembly rotates the cores radially, that is, the tips of the cores mutually approach in the closed position as each core rotates upon its turning mount.

Figures 16A, 16B, 17:
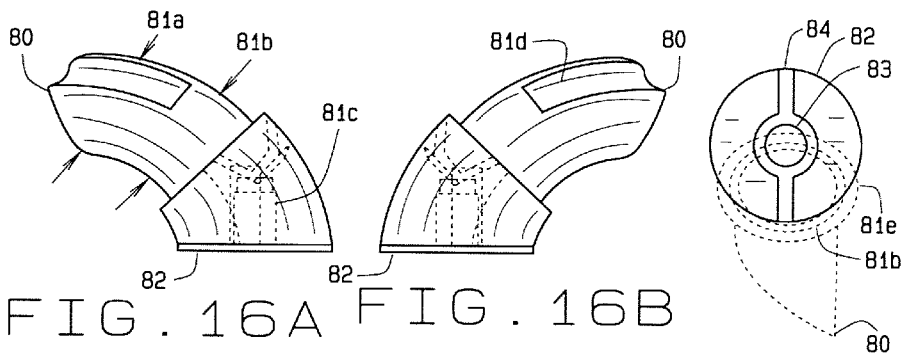
FIG. 16a describes a left side view of a core and FIG. 16b describes a right side view of a core.
FIG. 17 describes an end view of a core.

Looking more closely at the sweep cores 37, 38, themselves, FIG. 16a describes a left side view of a core and FIG. 16b describes a right side view of a core. As to FIG. 16a, the core has its tip 80, generally pointed that then expands abruptly in width to a widest diameter as at 81a. The core continues in an arcuate manner upon a constant radius of curvature from the widest diameter to a step as at 81b. The step leads to a thickening of the body through the ending portion of its radius as at 81c. The thickened portion then has a face forming the base 82 where the face is generally perpendicular to a line drawn tangent to the tip. As to FIG. 16b, this view is opposite that of the core in FIG. 16a. The body has the tip 80 as before, however, this side of the body has a slot 81d that begins at the tip and extends rearward from the tip for approximately one third of the length of the body. The slot has less width than the maximum diameter of the core. In this view, the step and thickening remain the same as in FIG. 16a.

FIG. 17 describes an end view of a core 37, 38 from its base 82. The base is generally round with a diameter proportional to the thickened portion 81c of the body. The base also includes a threaded aperture 83 that admits a bolt for connection of the core to a core mount. The aperture also has a groove 84 upon a diameter through the base. Outwardly from the base, that is, into the plane of the figure and along a curve downwardly, the body narrows its diameter from its maximum as at 81c to the step 81b, and then tapers gradually through the curvature to the tip 80. In this view, the body has a partially conic shape truncated along a somewhat 45° angle to the groove 84. This shaping of the body matches the desired interior shape of the resulting fuel throttle body that has laminar flow.

Figure 18A:
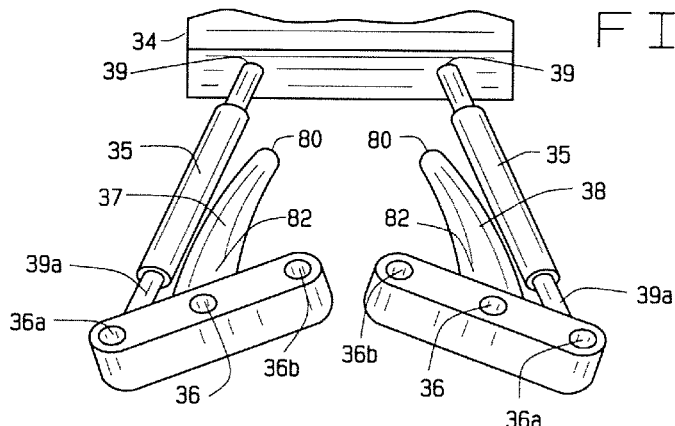
FIG. 18a provides a top view of the ram assembly in the open position, and FIG. 18b provides a top view of the ram assembly in the closed position.

As previously described in FIG. 2, the ej and cover inserts operate in conjunction with the ram assembly 4. The ram assembly has its components as described above that operate within the voids of the haunches and the branches. The components operate generally outwardly of the resulting throttle body, that is, towards the haunches with the cores moving within the branches as described in the ej insert and cover insert above. The ram assembly uses some existing components outwardly of the upper ball joint clamp 34. The upper ball joint clamp, comprising two mating halves, receives an end of two ball joint shafts 35 as shown in FIG. 18a. Each ball joint shaft 35 has a generally elongated and slender form with two opposite ends. Each end has a generally ball shape, not shown. One end, as at 39, presents its ball for placement within the two halves of the upper ball joint clamp 34 in a generally spherical void at the apex of a conical opening. The spherical void allows the ball joint shaft to rotate upon one axis, that is, motion of the ball joint shaft following the plane of the bottom surface 55, and upon a second axis, that is, motion of the ball joint shaft following the plane of the left side 52, so that in combination upon these two axes, the ball joint shaft generally follows a haunch. Upon the other end of a ball joint shaft, as at 38, the other end presents its ball for placement into an end 36a of a core mount 36. The core mount also uses two components to form a spherical void at the apex of a conical opening so that the ball joint shaft may move upon its two axes as the core mount rotates. Beneath the ball joint 38, the core mount has the base 82 of a core 37, 38 connected to it. With the ram 4 pushed inwardly into the die of the ej insert and the cover insert, the upper ball joint clamp 34 advances towards the pivots 36b, pushes the ball joint shafts 35 downwardly and outwardly, which turns the core mounts 36 outwardly and the attached cores outwardly to attain the orientation shown in FIG. 15A, the open position.

Figure 18B:
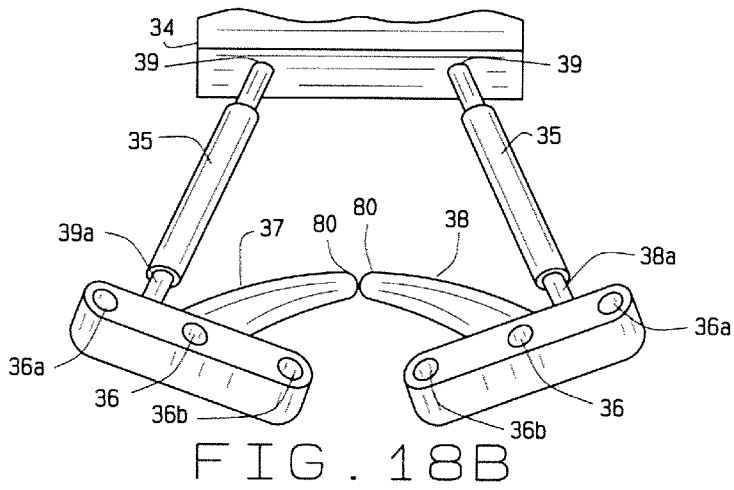

Following injection of material and preceding tooling into the voids, the ram retracts from the die of the invention, pulling the assembly 4 outwardly. In doing so, the upper ball joint claim 34 moves outwardly from the pivots 36b, pulling the ball joint shafts 35. The ball joint shafts pivot and pull upon their ball joints as at 38 which rotate the two core mounts mutually inwardly upon their pivot ends 36b as shown in FIG. 18b. As the core mounts move inwardly, they bring the sweep cores 37, 38 closer and closer until they reach a tip to tip abutment as shown, the closed position. With the cores so positions, the cores force material outwardly to their surfaces so that the bifurcations of the throttle body attain a laminar interior surface defined by the exterior of the core. Once a proper time has passed for the material to set, the ram advances inwardly to attain the orientation as shown and previously described for FIG. 18A. The proper time for setting material may be short, thus allowing for mechanizing of this die and ram assembly so that the invention may be operated at a rate of 1 over setting time throttle bodies per minute.

Figure 19:
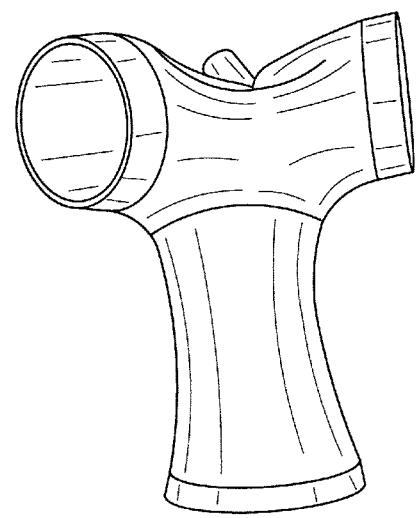
FIG. 19 illustrates a throttle body produced by the invention.

Having described the two inserts and the cooperating ram assembly, FIG. 19 shows a finished throttle body produced by the invention. The throttle body represents the interior surfaces of the cooperating inserts. The throttle body also has its two hollow bifurcations that represent the sweep cores 37, 38 when engaged inwardly and within the cooperating inserts.

Figure 20:
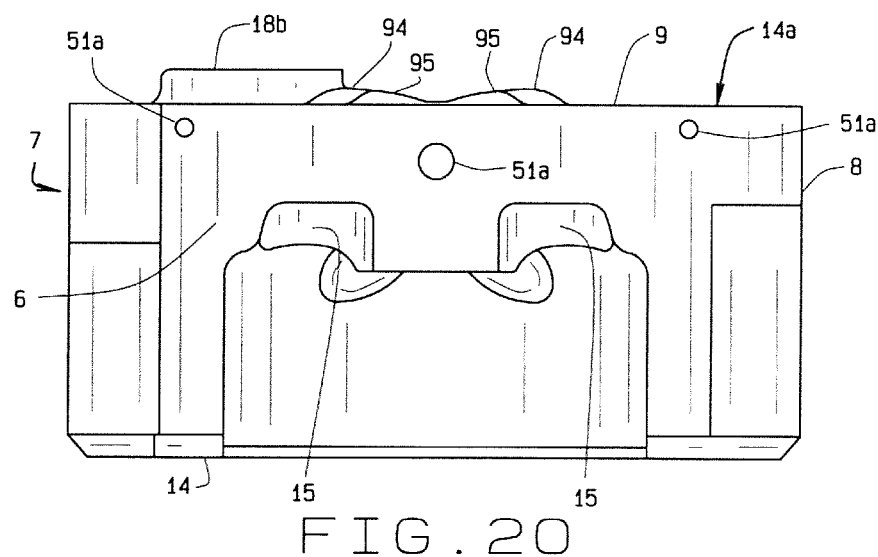
FIG. 20 provides an end view of an alternate embodiment of the ej insert of the invention.

An alternate embodiment of the inserts 2, 3 has its doghouses removed as shown in FIGS. 20-29. Adjusting the view from the bottom 10 to the perimeter of an alternate embodiment of ej insert 2, FIG. 20 shows an end view of the back 6. The back 6 begins from the back edge 14 and extends upwardly in a generally planar and rectangular shape. However, the rectangular shape of the back has two mirror image apertures 15. Each aperture has a rectangular shape with the longer axis of the shape oriented parallel to the back edge 14. The apertures open into the interior of the alternate embodiment. Outwardly from the apertures, the back has two spaced apart slots 26, generally concave, that extend from the back edge upwardly towards the lower edge of the aperture in the left of the drawing and towards the upper edge of the aperture in the right of the drawing. Each aperture curves inwardly and downwardly from its lower interior corner, that is, the corner closest to the back edge 14 and towards the center of the back 6. Centered between the apertures and spaced above them, the back has a port 51a that admits materials or tooling into the interior of the alternate embodiment of the ej insert. Above the port, this figure shows the top 9 of the ej insert. Centered upon the top back edge 14a, the top has two symmetrical hillocks 95 and outwardly from them two symmetrical protrusions 94. The protrusions extend further from the center of the top back edge than the hillocks. Towards the left of this figure upon the top 9, the ej insert has its shoulder 18b in the background. This shoulder has approximately double the height of the protrusion and a width greater than a protrusion but less than half of the width of the back.

Figure 21:
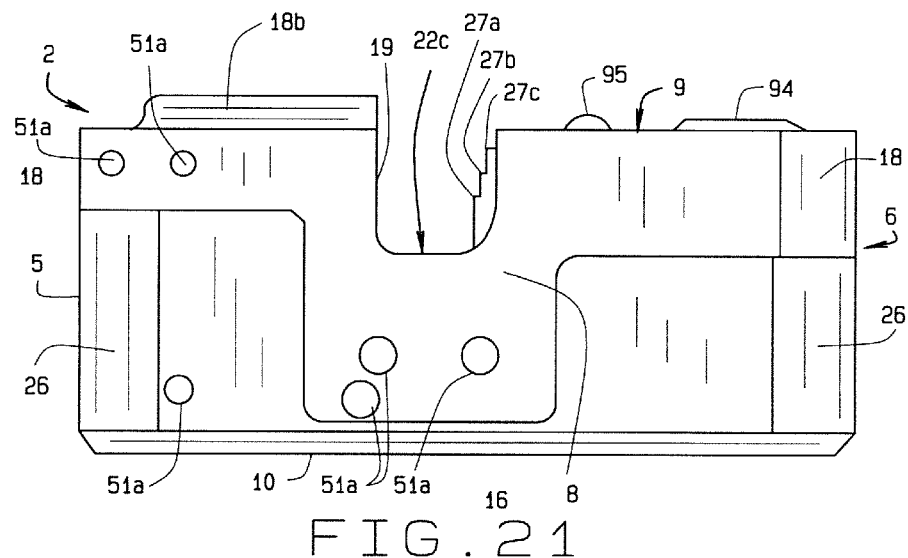
FIG. 21 shows a side view of the alternate embodiment of the ej insert.

Turning to FIG. 21, it shows a right side view of the alternate embodiment of the ej insert 2. The ej insert has the front 5 towards the left in the figure and the back 6 towards the right in the figure. Between the front and the back, the ej insert has its bottom 10 and the rounded corners where the front and the back intersect with the bottom. In this figure, the right edge 16 of the bottom is in the foreground and defines the bottom edge of the ej insert in this figure. The ej insert begins with an ear 18 upon a slot 26 that extends rearward from the front for approximately one third the length of the right side. The shoulder 18b rises from the ear, thickening the insert, as the shoulder extends above the plane of the top as at 9. The shoulder extends inwardly but short of the midpoint of the length of the right side. At the interior end of the shoulder, the alternate embodiment of the ej insert steps downwardly in thickness as at 19 where that thickness decreases to about one half of the preceding thickness. The ej insert then has flat bottomed groove as at 22c that has a width approximately that of the thickness of the ear 18 proximate the front 5. The flat bottomed groove 22c than transitions upwardly so that the insert returns to its typical thickness as at the top 9. The transition occurs over three steps in the width of the groove as shown at 27a, 27b, 27c. The first step 27a widens the groove and decreases its depth markedly. The second step 27b widens the groove from the first step's width and decreases the groove's depth from at the first step. Then the third step 27c widens the groove slightly more than the second step and decreases the groove's depth so that the groove then returns the insert thickness to that of the top 9. Outwardly from the groove 22c, the top has one of the hillocks 95 that extend slightly above the top. The top then returns to its thickness outwardly from the hillock for a space until the top has its protrusion 94 that also extends slightly above the top. The protrusion extends rearward more than the hillock but short of the back 6. The hillock and protrusion have spacing apart as shown. Outwardly from the protrusion 94, the insert has another ear 18 above a slot 26. Beneath the flat bottomed groove 22c, the insert has two ports 51a generally spaced apart at the same elevation from the bottom 10. These ports admit materials, tooling, heating, or cooling into the die formed of the two inserts. The right side 8 also includes various ports and apertures, not shown, for admission of subordinate tooling, air streams, and pelletized raw material.

Figure 22:
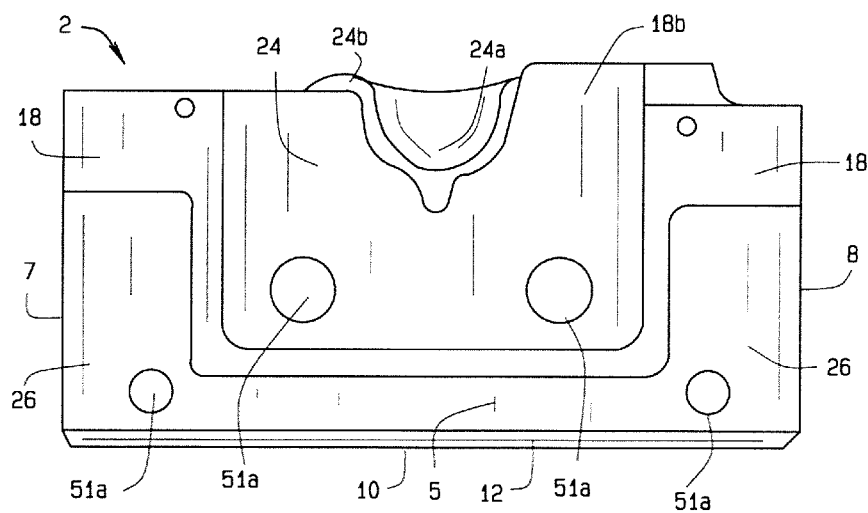
FIG. 22 illustrates an end view opposite FIG. 20 of the alternate embodiment of the ej insert.

Once more turning, this time to FIG. 22, it shows an end view, opposite that of FIG. 20 of the alternate embodiment of the ej insert with the front 5 in the foreground. This ej insert has the left side 7 and the opposite right side 8 as before and the bottom 10 merges with the left side and the right side along front edge 13 and forms corners. Upwardly from the bottom, the left side and the right side each terminate in ears 18 above slots 26. Each ear represents the maximum length of the left side and the right side generally along the top 9. Each ear has its thickness, less than that of the overall ej insert. Between the two ears, the front 5 has its well 24 of a generally rectangular shape but rounded at its bottom and inwardly. The well extends vertically from the ears downwardly towards the bottom for at least 50% of the thickness of the ej insert at the front 5 and extends into the plane of the paper for approximately the thickness of an ear 18. Inwardly from the front 5, the well 24 has a curved recess 24a, generally hemispherical in shape and opening towards the top 9. The curved recess extends slightly above the plane of the top as at 24b towards the left of the recess in this figure. Towards the right of the recess in this figure, the recess merges into the shoulder 18b here shown extending above the plane of the top 9 and above the recess as at 24b. Towards the rear of the well 24 and beneath the recess, the insert has two ports 51a as shown.

Figure 23:
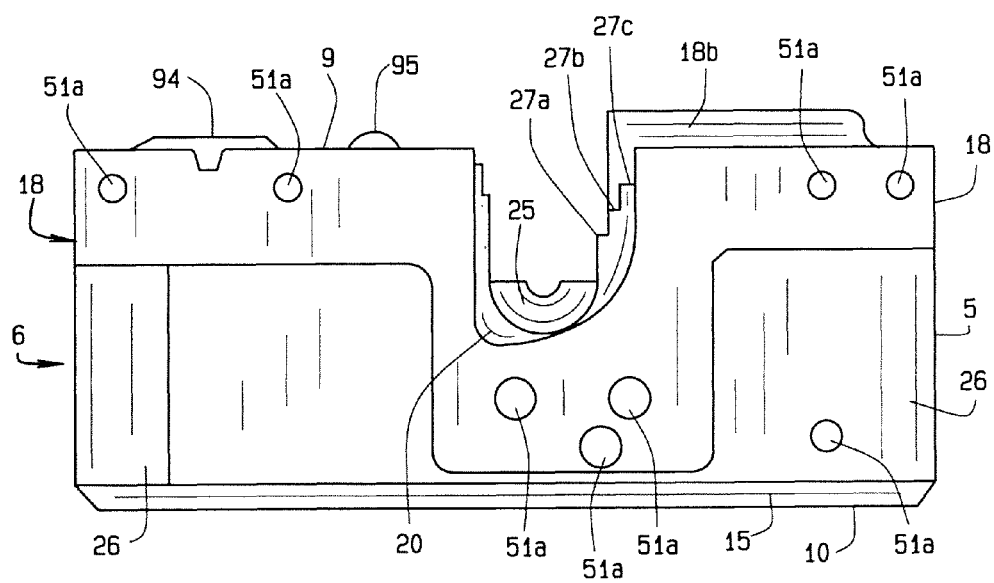
FIG. 23 describes a side view opposite FIG. 21 of the alternate embodiment of the ej insert.

FIG. 23 shows a left side view of the ej insert 2 in its alternate embodiment, this view being opposite that of FIG. 21 described above. The left side 7 of the ej insert begins with the back 6 towards the left in this figure. The back has its thickness shown by the ear 18 spaced above the slot 26 above the left edge 15. Inwardly from the front, the insert has the protrusion 94 that has its width as shown and that extends above the plane of the top 9. A space then follows the protrusion where the insert has its thickness denoted by the thickness of the ear and the height of the slot. At the end of the spacing, the insert has the hillock 95 extending above the plane of the top 9 and slightly more than the height of the protrusion in this view.

Inwardly from hillock 95, the insert has its flat bottomed groove 19. However, the groove steps downwardly, that is, towards the bottom 10 with its second step 20. The second step reduces the thickness of the ej insert to less than that below the ear 18 towards the left, nearly 50% of the thickness of the insert. The second step occurs approximately at the midpoint of the left side. Within the second step, the ej insert has its wall 25 generally transverse. Generally opposite the hillock, the flat bottom groove decreases in depth in its three steps as at 27a, 27b, 27c as previously described. The second and third steps merge into the shoulder 18b. The shoulder 18b extends upwardly from the plane of the top 9 and partially towards the front 5 as shown. The shoulder has a greater height above the plane of the top 9 than the hillock and the protrusion upon the opposite side of the groove. Beneath the shoulder, the insert has an ear 18 above a slot 26 at the right corner of the insert in this figure. As in FIG. 21, the insert has two ports 51a.

Having described the alternate embodiment from four perimeter faces, FIG. 24 shows a top view of the insert's alternate embodiment, with the top surface as at 9 in the foreground. The top 9 merges with the back 6 and the front 5, each being spaced apart and mutually parallel as previously described. The top merges along the front edge 28a and the back edge 28b. The top also merges with the left side 7 and the right side 8, also spaced apart and mutually parallel but perpendicular to the back and the front where the left side, right side, back, and front define a rectangular shape. The top merges to the sides along the left side edge 29a and the right side edge 29b respectively. The front edge 28a extends outwardly to the ears 18 and has the well 24 generally centered upon the front edge and beneath the front edge. The well as shown has a generally rectangular shape.

Interiorly from the well, the top 9 has the recess 24a. The groove has a generally rectangular shape, in plan view here in this figure, at the plane of the top 9 that becomes a somewhat half round cylinder recessed into the top. The recess has its position at approximately at the midpoint of the ej insert along the left side and the right side, or length. Interiorly from the recess, that is, towards the back 6, the ej insert has the left haunch 11 and the right haunch 12. The two haunches each have a mirror image shape along the centerline of the top parallel to the left side edge and the right side edge. The two haunches form a shape generally similar to a set of horns extending from a common central area, as at 11a, outwardly and downwardly curved to a truncated tip on each haunch. The haunches generally have a recessed orientation into the top 9 that is into the plane of the figure. The haunches in this embodiment remain with the protrusions 94 and the hillocks 95.

This central area 11b has a width slightly more than each haunch and its width narrows slightly along the centerline of the top below in this figure, that is, inwardly, where the two haunches merge. The top also includes various ports and holes for admission of tools, raw material, and bolts for securing the ej insert to the remainder of the invention.

FIG. 25 illustrates a bottom view, opposite FIG. 9, of an alternate embodiment of the cover insert with the bottom surface as at 55 in the foreground. This bottom surface 55 mates with the top 9 of the ej insert previously described. The bottom 55 merges with the back end 51 and the front end 50, each being spaced apart and mutually parallel previously described. The bottom merges along the front edge 56 with its indentation as at 56a and the back edge 57. The bottom also merges with the left side 52 and the right side 53, also spaced apart and mutually parallel but perpendicular to the back and the front where the left side, right side, back, and front define a generally rectangular shape. The bottom merges to the sides along the left side edge 58a and the right side edge 59b respectively. The front edge 56 extends outwardly to the ears 18 and has the other well 68 generally centered upon the front edge and upwardly from the front edge in this figure, that is, inwardly upon the cover insert. The other well as shown has a generally rectangular shape but has the indentation 56a within it.

Interiorly from the other well 68, the bottom surface 55 has the two spaced apart and mutually parallel channels 70 as before that extend from the well and flare outwardly proximate the valley 65. The valley has its curved shape, similar to a barrel that extends into the cover insert, that is, into the plane of the figure. The valley has its edges 66 that parallel the front end 50. The valley empties into a somewhat rectangular plain 71 that cooperates with the central area of the ej insert. Opposite the channels, the valley opens into two branches, a left branch 72 and a right branch 73. The two branches each have a mirror image shape along the centerline of the bottom surface 55 parallel to the left side edge and the right side edge. The two branches form a shape generally similar to a truncated letter Y extending from the plain 71, outwardly and downwardly curved to a truncated tip on each branch. The branches generally have a recessed orientation into the bottom surface 55, that is, into the plane of the figure. The two branches cooperate with the two haunches of the ej insert forming a void defining the two merge portions of the fuel throttle body produced by this die set. The two branches form inwardly of a left hill 91 and a right hill 92 generally in mutual mirror image. The left hill and the right hill have a rotated L like shape that when combined appear as an inverted U shape as shown. As later shown in the side views, FIG. 27, 29, the hills extend outwardly from the plane of the bottom surface, that is, towards the reader. Where the two hills mutually approach, the hills lessen in height and form a subvalley as at 71a. Ninety degrees counterclockwise from the subvalley 71a, the cover insert has a draw 90 generally collinear with the valley 65. The draw extends into the cover insert, that is, away from the reader. The draw has slightly less width than the valley. The cover insert also includes various ports and holes for admission of tools, raw material, and bolts for securing the cover insert to the remainder of the invention.

Figure 26:
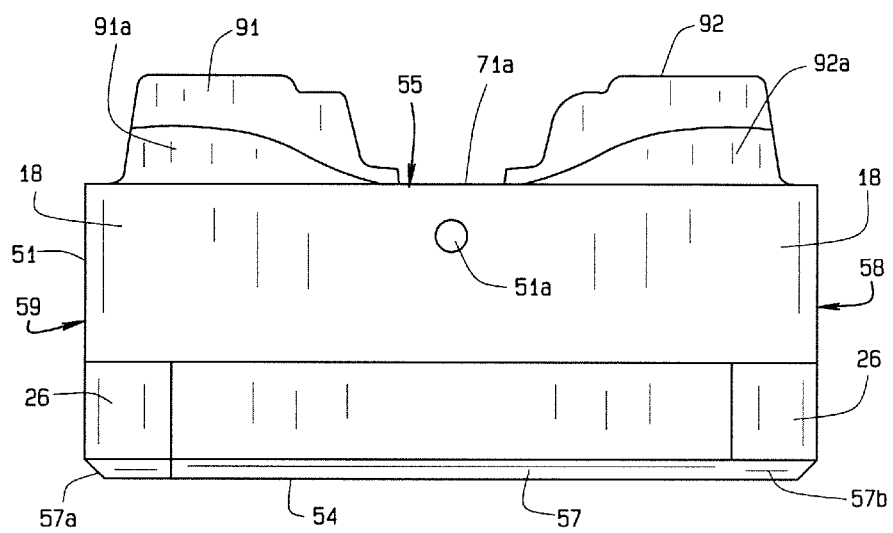
FIG. 26 illustrates an end view of the alternate embodiment of the cover insert.

Rotating from the FIG. 25 view, FIG. 26 illustrates an end view of the cover insert, particularly the back end 51. This back end 51 begins from the back edge 57 and extends upwardly, that is, away from its top surface 54. The back end has two ears 18, spaced apart and defining the corners of the cover insert. Each ear is above a slot 26. However, the rectangular shape of the back partially extends upwardly from the bottom surface through the two mirror image hills, the right hill 91 and the left hill 92. The hills extend out of the plane of the bottom surface at least 25% of the thickness of the cover insert. In this view, each hill has a somewhat rectangular form shorter than it is wider with its interior end abruptly tapering towards the subvalley 71a. Each hill also has a face of lesser height and flatter slope as at 91a, 92a as shown. When the cover insert mates with the ej insert, the hills 91, 92 are generally outside the haunches 71, 72 so that the haunches and hills cooperate to form voids, such as the branches of the valley, for movement of the cores therein. The hills act to cabin the branches of the valley between the two hills. The hills as machined into the cover insert also replace the dog houses of the previous embodiment. By including the hills in the cover insert, the maintenance costs of the die formed of the two insert decline noticeably.

Figure 27:
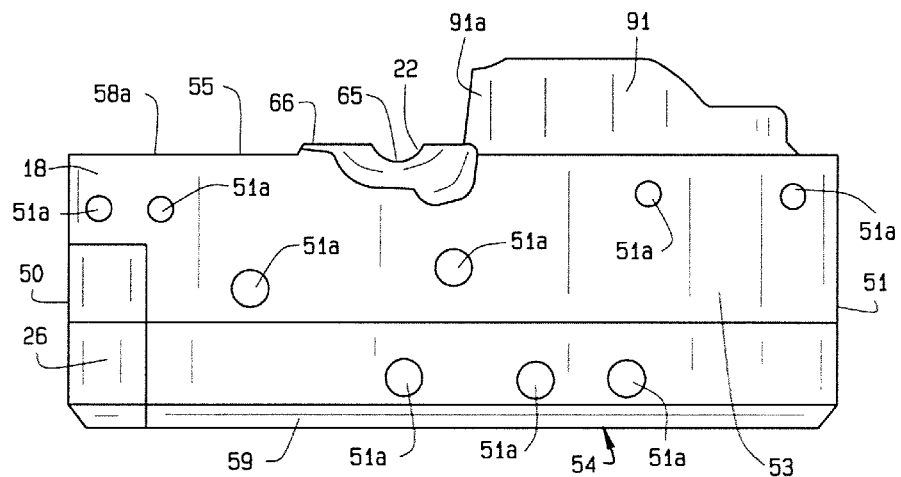
FIG. 27 provides a side view of the alternate embodiment of the cover insert.

Then FIG. 27 illustrates a right side view of an alternate embodiment of the cover insert 3. The cover insert has the front end 50 towards the left in the figure and the back end 51 towards the right in the figure. Between the front end and the back end, the cover insert has its top surface 54 and the rounded corners where the front end and the back end intersect with the top. In this figure, the right edge 59 of the top is in the foreground and defines the top edge, generally straight, of the cover insert shown in this figure. The cover insert begins an ear 18 to the left in this figure and a slot 26 beneath that ear. The slot has a generally convex cross section, that is, a curvature with a radius from the center of the cover insert. The ear though defines a square corner over the slot. From the slot and the ear to the right, that is, inwardly from the front end, the cover insert has its generally constant thickness to the vicinity of the midpoint of the right side 53. As the right side approaches its midpoint, its thickness decreases at a valley edge 66 here shown as an indentation in the figure towards the top 54. Into the plane of the paper within the valley edge 66, the cover insert has a partial groove 22 that mates with its counterpart groove in the ej insert 2. The partial groove 22 extends for about half the length of the counterpart groove as previously shown in the bottom view of the cover. Outwardly from the valley 65, that is, towards the back end 51, the cover insert has the right hill 91 with its face 91a proximate the valley 65. The right hill extends at generally a constant height above the bottom surface 55 for approximately 20% of the length of the cover and then the hill steps downwardly. The hill ends, or returns, to the bottom surface 55 short of the back end 51. The right side 53 also includes various ports and apertures, not shown, for admission of subordinate tooling, air streams, and pelletized raw material.

Figure 28:
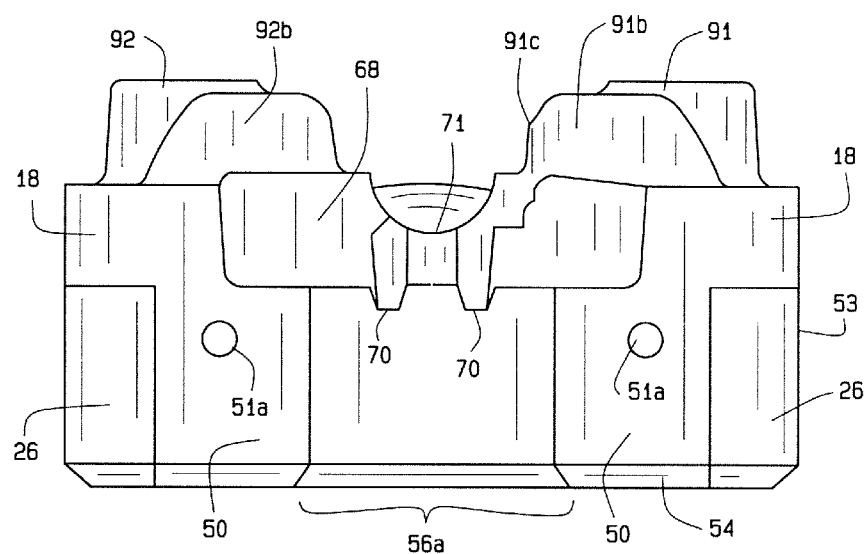
FIG. 28 illustrates an end view opposite FIG. 26 of the alternate embodiment of the cover insert; and, FIG. 29 describes a side view opposite FIG. 27 of the alternate embodiment of the cover.

Moving around the perimeter of the cover insert clockwise, FIG. 28 shows an end view, opposite FIG. 26 of the cover insert with the front end 50 in the foreground. The cover insert has the left side 52 and the opposite right side 53 generally mutually parallel and spaced apart. The top 54 merges with the left side and the right side along front edge 56 and forms rounded corners as previously shown. Upwardly from the top, the left side and the right side each terminate in ears 18 above slots 26. Each ear represents the maximum length of the left side and the right side generally along the bottom surface 55 of the cover insert 3. Each ear has its thickness, less than that of the overall cover insert. Between the two ears, the front end 50 has another well 68 of a generally rectangular shape indented towards the interior of the cover insert. The other well extends vertically from the top 54 upwardly towards the bottom surface 55 more than the thickness of the ears and less than the thickness of the cover insert at the front end 50 and extends into the plane of the paper for approximately the thickness of an ear 18, as previously shown in FIG. 25. Inwardly from the left side and the right side and beneath the other well 68, the front end has a curved recess 56a, generally curved in shape and opening towards the front end 50. This curved recess 56a extends upwardly from the top 54 and intersects the other well 68. Inwardly from the center of the other well at the bottom surface 55, the central plain 71 extends generally along the centerline of the cover insert and receives the two channels 70 here shown on end. Flanking the central plain, the front end has the left hill 91 towards the left in this figure and the right hill 92 opposite it. The hills have a nearly symmetric shape and layout upon a centerline of this figure. The hills extend above the bottom surface 55 and each generally occupies approximately one third of the width of the front end. The left hill has a face 92b of lesser height and width than the left hill itself. The face 92b is somewhat flat and nearly parallel to the front end. On the opposite side of the central plain 71a, the cover insert has the right hill 91 and its face 91b. This face 91b also has less width and height than the right hill but a somewhat flat and nearly parallel orientation to the front end. This face 91b has a corner treatment towards the interior and above the bottom surface 55 as at 91c that prevents full symmetry with the left hill. The front end 50 also includes various ports and apertures, not shown, for admission of subordinate tooling, air streams, and pelletized raw material.

Figure 29:
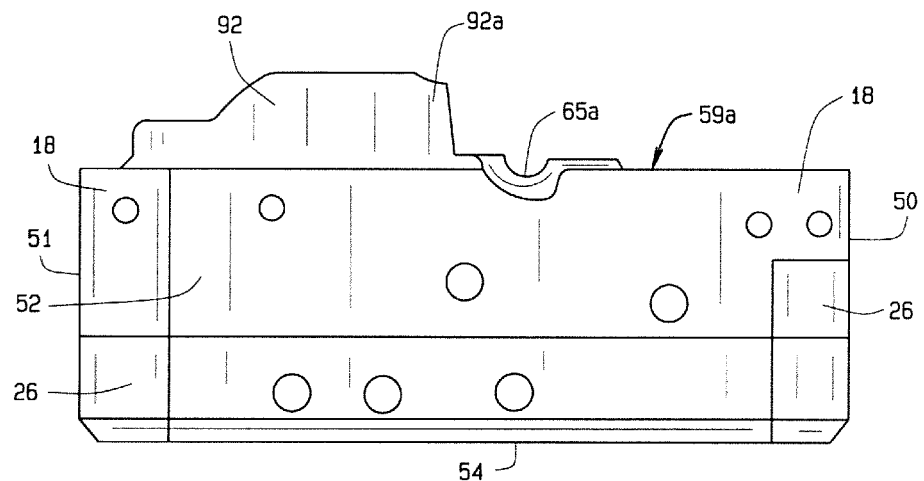

And, turning the alternate embodiment of cover one more time, FIG. 29 illustrates a left side view of the cover insert, this view being opposite that of FIG. 27 described above. The left side 52 of the cover insert begins with the back end 50 towards the left in this figure. Inwardly from the back end, the bottom surface continues for a short distance until the left hill begins its slope upwardly, that is, above the bottom surface. The left hill 92 begins at a short step up in height and then increases to its full height. The left hill extends for approximately 20% of the length of the cover insert. The left hill then has its face 92a that adjoins the draw 65a. The draw has a shallow rounded shape into the cover insert and of less depth than the valley 65 on the opposite side of the cover insert. Outwardly from the draw, the cover insert has a slight increase in thickness for short distance and then the cover insert returns to its typical thickness for approximately one third of the length of the cover insert to the front end 51. Just before the front end, the cover insert partially lessens its thickness to form an ear 18 at the bottom surface 55 and spaced above the top surface 54 with a slot 26 beneath the ear. The left side 52 also includes various ports and apertures, not shown, for admission of subordinate tooling, air streams, and pelletized raw material.

From the aforementioned description, a sweep core die device has been described. The sweep core die device is uniquely capable of moving two conically shape cores simultaneously upon two or more axes within a two insert die. The device operates under high pressures and rapid speeds so that many throttle bodies per hour can be manufactured. The sweep core die device and its various components may be manufactured from many materials, including but not limited to, steel, tool steel, aluminum, polymers, polypropylene, polyvinyl chloride, high density polyethylene, polypropylene, ferrous and non-ferrous metals, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for making a part having internal laminar flow of fluid there through, said device comprising:
   two mutually engaging inserts, said inserts cooperating and having mutual voids therein, said inserts adapted to make the part;
   a ram assembly operatively entering said inserts and partially occupying said mutual voids;
   said inserts including an ej insert being generally rectangular and having a front, an opposite back, a right side, an opposite left side, a bottom and an opposite top, and a cover insert being generally rectangular and having a front, an opposite back, a right side, an opposite left side, a bottom and an opposite top wherein said bottom of said cover insert mates with said top of said ej insert; and,
   wherein said ram assembly, said ej insert and said cover insert cooperate and are adapted to make the part hollow;
   said bottom of said ej insert being generally planar and flat;
   said top of said ej insert having two haunches therein, said haunches extend generally away from said top and towards said left side and said right side respectively, wherein said ram assembly operates upon said haunches.

2. The part making device of claim 1 further comprising:
   at least one dog house upon said ej insert, said at least one dog house extending away from said top and outwardly from one of said haunches.

3. The part making device of claim 1 further comprising:
   said top of said cover insert being generally planar and flat;
   said bottom of said cover insert having a valley formed therein generally towards said top and extending generally parallel to said left side and two branches extending outwardly from said valley in an arcuate manner proximate said back, wherein said ram assembly operates within said branches.

4. The part making device of claim 3 further comprising:
   said bottom of said cover insert having two hills formed therein generally towards bottom and each having a generally inverted L like shape and mirror image, said hills positioned towards said back and towards said left side and said right side respectively, said hills cabining said branches.

5. The part making device of claim 1 further comprising:
   said ram assembly having two core mounts, two cores and each of said cores attaching to one of said core mounts, two ball joint shafts and each of said ball joint shafts attaching to one of said core mounts, and a ball joint clamp receiving each of said ball joint shafts in a spaced apart arrangement;
   each of said ball joint shafts connecting to said ball joint clamp and to each of said core mounts utilizing a ball joint;
   wherein said ram assembly simultaneously rotates said cores from an open position proximate said left side and said right side respectively to a closed position mutually inward of said left side and said right side respectively as said cores mutually engage within said ej insert and said cover insert.

6. The part making device of claim 5 further comprising:
   said ram assembly simultaneously rotating said cores radially between said open position and said closed position.

7. A device for making a part having internal laminar flow through a hollow bifurcation, said device comprising:
   an ej insert being generally rectangular and having a front, an opposite back, a right side, an opposite left side, a bottom and an opposite top, wherein the bottom of said ej insert denotes a lowest portion of said device;
   a cover insert being generally rectangular and having a front, an opposite back, a right side, an opposite left side, a bottom and an opposite top wherein said bottom of said cover insert mates with said top of said ej insert, wherein the top of said cover insert denotes a highest portion of said device;
   said ej insert and said cover insert cooperating and having mutual voids formed therein, said inserts adapted to make the part;
   a ram assembly operatively entering said inserts and partially occupying said mutual voids; and,
   wherein said ram assembly, said ej insert and said cover insert cooperate and are adapted to make the part hollow;
   said ram assembly having two core mounts and each of said core mounts including a first end and an opposite second end, two cores and each of said cores attaching to a first end of one of said core mounts, two ball joint shafts and each of said ball joint shafts pivotally connecting to said core mount between its first end and its second end, and a ball joint clamp receiving each of said ball joint shafts in a spaced apart arrangement;
   each of said ball joint shafts connecting to said ball joint clamp utilizing a ball joint and to each of said core mounts utilizing a ball joint;
   each second end of each of said mounts connecting to said ej insert utilizing a ball joint; and,
   wherein said ram assembly simultaneously radially rotates said cores from an open position proximate said left side and said right side respectively to a closed position mutually inward of said left side and said right side respectively as said cores mutually engage within said ej insert and said cover insert.

8. The part making device of claim 7 further comprising:
   said bottom of said ej insert being generally planar and flat;
   said top of said ej insert having two haunches therein, said haunches extend generally away from said top and towards said left side and said right side respectively, wherein said ram assembly operates upon said haunches;
   said top of said cover insert being generally planar and flat; and,
   said bottom of said cover insert having a valley formed therein generally towards said top and extending generally parallel to said left side and two branches extending outwardly from said valley in an arcuate manner and in mirror image proximate said back, wherein said ram assembly operates within said branches.

9. The part making device of claim 8 further comprising:
said bottom of said cover insert having two hills formed therein generally towards bottom and each having a generally inverted L like shape and mirror image, said hills positioned towards said back and towards said left side and said right side respectively, said hills cabining said branches.

10. The part making device of claim 8 further comprising:
at least one dog house upon said ej insert, said at least one dog house extending away from said top and outwardly from one of said haunches.

11. The part making device of claim 8 further comprising:
said ej insert including said front and said back being mutually parallel and spaced apart, said right side and said left side being mutually parallel and spaced apart and perpendicular to said front, said bottom and said top being mutually parallel and spaced apart and perpendicular to said front and perpendicular to said right side; and,
said cover insert including said front and said back being mutually parallel and spaced apart, said right side and said left side being mutually parallel and spaced apart and perpendicular to said front, said bottom and said top being mutually parallel and spaced apart and perpendicular to said front and perpendicular to said right side.

12. An assembly for rapidly and repetitively making a hollow part having internal laminar flow through a bifurcation, said assembly comprising:
an ej insert being generally rectangular and having a front, an opposite back, a right side, an opposite left side, a planar flat bottom and an opposite top, said front and said back being mutually parallel and spaced apart, said right side and said left side being mutually parallel and spaced apart and perpendicular to said front, said bottom and said top being mutually parallel and spaced apart and perpendicular to said front and perpendicular to said right side, wherein the bottom of said ej insert denotes a bottom of said assembly;
said top of said ej insert having two recessed haunches, said haunches extend generally away from said top and towards said left side and said right side respectively;
a cover insert being generally rectangular and having a front, an opposite back, a right side, an opposite left side, a bottom and an opposite planar flat top, said front and said back being mutually parallel and spaced apart, said right side and said left side being mutually parallel and spaced apart and perpendicular to said front, said bottom and said top being mutually parallel and spaced apart and perpendicular to said front and perpendicular to said right side, wherein said bottom of said cover insert mates with said top of said ej insert, wherein the top of said cover insert denotes a top of said assembly;
said bottom of said cover insert having a valley recessed therein generally towards said top and extending generally parallel to said left side and two branches extending outwardly from said valley in an arcuate manner and in mirror image proximate said back;
said ej insert and said cover insert cooperating and forming mutual voids within said assembly, said inserts adapted to make the part;
a ram assembly operatively entering said inserts and partially occupying said mutual voids;
said ram assembly having two core mounts and each of said core mounts including a first end and an opposite second end, two cores and each of said cores attaching to a first end of one of said core mounts, two ball joint shafts and each of said ball joint shafts pivotally connecting to said core mount between its first end and its second end, and a ball joint clamp receiving each of said ball joint shafts in a spaced apart arrangement;
each of said ball joint shafts connecting to said ball joint clamp utilizing a ball joint and to each of said core mounts utilizing a ball joint;
each second end of each of said mounts connecting to said ej insert utilizing a ball joint;
wherein said ram assembly, said ej insert and said cover insert cooperate and are adapted to make the part hollow;
wherein said ram assembly simultaneously radially rotates said cores within said haunches from an open position proximate said left side and said right side respectively to a closed position mutually inward of said left side and said right side respectively as said cores mutually engage within said ej insert and said cover insert.

13. The part making device of claim 12 further comprising:
at least one dog house upon said ej insert, said at least one dog house extending away from said top and outwardly from one of said haunches.

14. The part making device of claim 12 further comprising:
said bottom of said cover insert having two hills formed therein generally towards bottom and each having a generally inverted L like shape and mirror image, said hills positioned towards said back and towards said left side and said right side respectively, said hills cabining said branches.

* * * * *